United States Patent [19]

Goertz

[11] 4,378,238

[45] Mar. 29, 1983

[54] CONTROLLED RELEASE PARTICULATE FERTILIZER COMPOSITION

[75] Inventor: Harvey M. Goertz, Marysville, Ohio

[73] Assignee: The O.M. Scott & Sons Company, Marysville, Ohio

[21] Appl. No.: 288,457

[22] Filed: Jul. 30, 1981

[51] Int. Cl.³ .............................................. C05C 9/02
[52] U.S. Cl. ............................................ 71/3; 71/28; 71/29; 71/64.11; 71/903; 71/904; 564/59
[58] Field of Search .................. 71/28, 903, 904, 64.4, 71/29, 30, 3; 564/59

[56] References Cited

U.S. PATENT DOCUMENTS

3,076,700  2/1963  Renner .................................... 71/904
4,025,329  5/1977  Goertz ................................. 71/28 X
4,089,899  5/1978  Greidinger et al. .................. 564/59

Primary Examiner—Ferris H. Lander
Attorney, Agent, or Firm—James B. Raden; Harold J. Holt

[57] ABSTRACT

A controlled release particulate fertilizer composition prepared by the reaction of urea and formaldehyde comprising polymeric nitrogen in the form of methylene urea polymers of varying chain length. The majority of the polymeric nitrogen consists of short chain polymers selected from the group consisting of methylene diurea, dimethylene triurea and mixtures thereof and the average degree of polymerization of urea and formaldehyde is greater than 1.5. The fertilizer compositions combine safety and high levels of plant nutrient efficiency.

16 Claims, 4 Drawing Figures

CONTROLLED RELEASE PARTICULATE FERTILIZER COMPOSITION

BACKGROUND OF THE INVENTION

This invention relates to a particulate fertilizer composition prepared by the reaction of urea and formaldehyde.

Urea-formaldehyde condensation products are widely used as slow or controlled release nitrogen fertilizers. The condensation products contain methylene urea polymers of varying chain length. The higher methylene urea polymers have limited solubility in soil solution and hence serve to prolong the release of nitrogen. The method of nitrogen release is normally thought to be by microbial decomposition. Most of the literature relating to such products has emphasized the importance of the longer chain water insoluble polymers which have been considered safer and desirable for slow release. The products have traditionally been characterized in terms of the water insolubility of their nitrogen fractions. The 1980 standards of the Association of American Plant Food Control Officials (AAPFCO), for example, requires that any fertilizer labeled as urea-formaldehyde, or ureaform, must have at least 60% of its nitrogen in water-insoluble form with an activity index of at least 40 (Official Publication, AAPFCO, No. 33, Rules N-24, N-25, 1980). Activity Index (AI) is the percent of the cold water insoluble nitrogen (CWIN) which is soluble in hot water:

$$AI = \frac{CWIN - HWIN}{CWIN} \times 100 \text{ (HWIN is hot water insoluble nitrogen)}$$

The longer chain water insoluble polymers are, in fact, much less agronomically active than the shorter chain polymers. Generally, the efficiency of plant utilization decreases as the methylene urea polymer chain increases. It has been known for some time that a portion of the cold water insoluble nitrogen fraction (CWIN) has a very low mineralization rate and is very inefficient in terms of its practical use to a plant. This inefficient fraction is the hot water insoluble nitrogen (HWIN). Accordingly, the official definition of AAPFCO limits the allowable presence of this HWIN fraction. However, even with this limitation, a substantial portion of the nitrogen (36%-60%) may still be present in this very inefficient hot water insoluble form. Attempts have been made to increase the efficiency of the product by mixing the urea-formaldehyde reaction products with soluble nitrogen sources such as urea. This has the effect of decreasing the HWIN fraction, increasing the available nitrogen and providing "quick release" properties to the mixture. However, it also adds substantially to the "burn" or phytotoxic potential of the mixture. It is important to note that urea is present in substantially all urea-formaldehyde fertilizer compositions from incomplete or equilibrium reactions during polymerization. Such unreacted urea has the same agronomic response and tolerance as commercially available urea which is deliberately added.

The manufacture of slow release urea-formaldehyde reaction products for fertilizer applications requires considerable skill to produce the proper degree of polymerization required to achieve the desired fertilizer characteristics. Normally, they are prepared by first reacting urea and formaldehyde at elevated temperatures in an alkaline solution to produce methylol ureas. The reaction mixture is then acidified which causes the methylol ureas to polymerize rapidly to form methylene urea polymers of varying chain length.

U.S. Pat. No. 4,089,899 to Greidinger et al discloses what is there described as a controlled reaction system for preparing slow release ureaform compounds with a low average degree of polymerization. The Greidinger et al process involves the reaction of urea and formaldehyde in the presence of an acid catalyst for extended reaction times at low temperatures. While the patent discloses urea-formaldehyde compositions containing polymers having a somewhat lower degree of polymerization than conventional ureaform fertilizers, the compositions still contain large proportions of longer chain polymers. Moreover, the Greidinger et al process is incapable of producing compositions having a significantly lower degree of polymerization than those there shown.

U.S. Pat. No. 3,677,736 to Formaini discloses a multistage process for producing a liquid fertilizer suspension of ureaform. Broadly, the process involves the reaction of urea and formaldehyde in the presence of ammonia at an alkaline pH followed by acidification. The final product is stated to be a liquid fertilizer containing ureaform having a relatively high activity index, that is, a relatively small amount of the hot water insoluble (HWIN) fraction.

SUMMARY OF THE INVENTION

It is a primary object of the present invention to increase the agronomic efficiency of controlled release solid nitrogen fertilizer products.

It is an additional object of this invention to provide a controlled release solid nitrogen fertilizer which possesses the agronomic efficiency typical of soluble fertilizers such as urea but which has much greater safety.

It is a more specific object of this invention to provide a free flowing, particulate fertilizer composition prepared by the reaction of urea and formaldehyde which has substantially increased proportions of the agronomically more efficient short chain methylene urea polymers.

The present invention is directed to a controlled release solid fertilizer composition in particulate form comprising the reaction product of urea and formaldehyde, the reaction product containing polymeric nitrogen in the form of methylene urea polymers of varying chain length, the majority of the polymeric nitrogen consisting of short chain polymers selected from the group consisting of methylene diurea, dimethylene triurea and mixtures thereof and the average degree of polymerization of urea and formaldehyde being greater than 1.5. The aforementioned compositions have been found to provide agronomic efficiency which is substantially greater than the most efficient controlled release solid fertilizer compositions presently known without substantial sacrifice of either safety or slow release. Agronomic efficiency is herein defined as the ratio of nitrogen taken up by the plant to the total nitrogen applied, measured by the plant growth response (color, fresh weights, etc.).

DETAILED DESCRIPTION

The invention has as its major emphasis the water soluble short chain methylene urea polymer fraction of the fertilizer compositions. Applicant has found that the short chain polymers more closely resemble urea in their efficiency of plant nutrient uptake but, unlike urea, are safe and not prone to environmental losses such as by leaching and volatilization. The accepted method of characterizing nitrogen-polymer distributions has previously been based solely on CWIN and HWIN determinations, values which characterize only the distributions of the longer methylene urea chains. The present invention, on the other hand, deals with the entire polymeric distribution including the methylene urea polymers contained in cold water soluble nitrogen (methylene diurea and dimethylene triurea), in hot water soluble nitrogen and in hot water insoluble nitrogen.

In the fertilizer compositions of the invention, at least 50% of the polymeric nitrogen will come from short chain methylene diurea and dimethylene triurea polymers. The remainder of the methylene urea polymers will be the higher water insoluble polymers containing from four to six urea units including trimethylene tetraurea, tetramethylene pentaurea and pentamethylene hexaurea. The average degree of polymerization of the urea and formaldehyde in the present compositions is always greater than 1.5. That is, the ratio of urea to methylene groups in the methylene urea polymers averages over 1.5. In addition to the methylene urea polymers, the compositions will normally also contain nitrogen from other sources, primarily from urea. The urea will usually be present in an amount ranging up to 70% by weight and usually more than 10%. The preferred compositions of the invention contain both urea and methylene urea polymers, such that at least 45% of the nitrogen consists of cold water soluble reaction products when the amount of CWIN is between 15 and 35 percent of the nitrogen and more than 35% of the nitrogen consists of cold water soluble reaction products when the amount of CWIN is less than 15%. Even more preferably, less than 20% by weight consists of CWIN. (All values of CWIN and HWIN referred to herein are determined in accordance with Official Methods of Analysis of the Association of Official Analytical Chemists, 13th Edition, 1980, Procedure 2.079).

Figure 1:
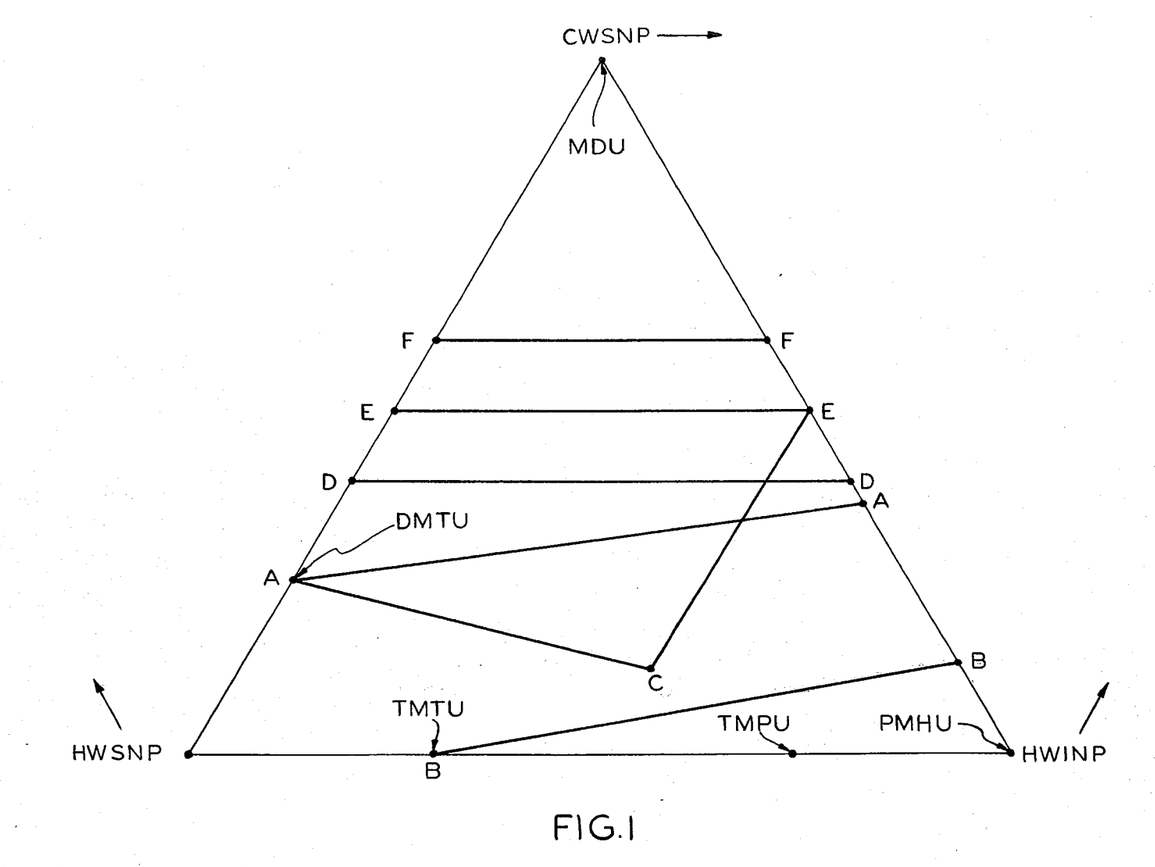
FIG. 1 is a ternary diagram showing the water solubility distribution of the various methylene urea polymers in the compositions of the invention.

FIG. 1 is a ternary diagram showing the nitrogen water solubility distribution of methylene urea polymers only—that is, cold water soluble nitrogen polymers (CWSNP), hot water soluble nitrogen polymers (HWSNP) and hot water insoluble nitrogen polymers (HWINP). Each of these fractions forms a vertex on the diagram. This ternary diagram thus includes all possible proportions of methylene urea polymers of different degrees of polymerization.

Analytical techniques have not yet been developed which specifically identify all polymer chain lengths. However, high pressure liquid chromatography methods have recently been developed by the present assignee to identify and quantify levels of methylene diurea (MDU) and dimethylene triurea (DMTU) in a water solution. The remaining longer chain polymers are characterized through conventional solubility measurements in cold and hot water. MDU, which has a degree of polymerization (D.P.) of 2.0, is completely soluble in cold water and therefore appears at the top vertex of the diagram. DMTU, which has a D.P. of 1.5, is 25% soluble in cold water, 75% soluble in hot water and thus appears as a point along the left edge of the diagram. Although the higher methylene urea polymers have not been isolated their solubilities can be interpolated from existing experimental evidence. Positions of the following polymers are also plotted:

TMTU (D.P.=1.33)—Trimethylene tetraurea;
TMPU (D.P.=1.25)—Tetramethylene pentaurea;
PMHU (D.P.=1.20)—Pentamethylene hexaurea.

PMHU and higher polymers (D.P.$\leq$1.20) are assumed to be totally insoluble in hot water.

Based on the assumption that solubilities of polymer mixtures are linearly related to the proportions of the various polymers present, solubility regions can be defined by average degree of polymerization. Thus, the lines A—A and B—B in FIG. 1 define an average D.P. of 1.5 and 1.33, respectively. Polymer mixtures of average D.P.<1.33 would occupy the solubility region below line B—B. Mixtures with average D.P.>1.5 would occupy the solubility region above line A—A. Mixtures with average D.P. between 1.33 and 1.5 occupy the space between the two lines.

In the present compositions, more than 50% of the polymeric nitrogen consists of short chain polymers. This region is defined by the line A-C-E in FIG. 1. Point C is the midpoint of a line connecting point A (100% DMTU) and the HWINP vertex (100% long chain polymers). Point E is similarly the midpoint of a line connecting 100% MDU and the HWINP vertex. All compositions below, or to the right, of line A-C-E are thus excluded from the scope of the invention. In addition, the present compositions preferably contain less than 60% of their polymeric nitrogen in water insoluble form—or conversely over 40% of their polymeric nitrogen in cold water soluble form. This region is defined by the line D—D. The fertilizer compositions of the invention thus preferably contain polymeric nitrogen proportions falling in the region of the ternary diagram to the left of line C-E and above the line D—D. In its even more preferred form, the fertilizer compositions of the invention contain over 50% of the polymeric nitrogen from cold water soluble polymers. This is shown by the region above line E—E. In its most preferred form, the compositions derive over 60% of their polymeric nitrogen from cold water soluble polymers and these compositions are shown above the line F—F in FIG. 1. The percentage of polymeric nitrogen in cold water soluble form is determined by the weight ratio of nitrogen from MDU and DMTU to the total polymeric nitrogen content. The total polymeric nitrogen content is in turn the sum of CWIN, as analyzed by AOAC procedures, plus nitrogen from MDU and DMTU. Nitrogen from MDU and DMTU are determined through Liquid Chromatography of the cold water soluble fraction.

Figure 2:
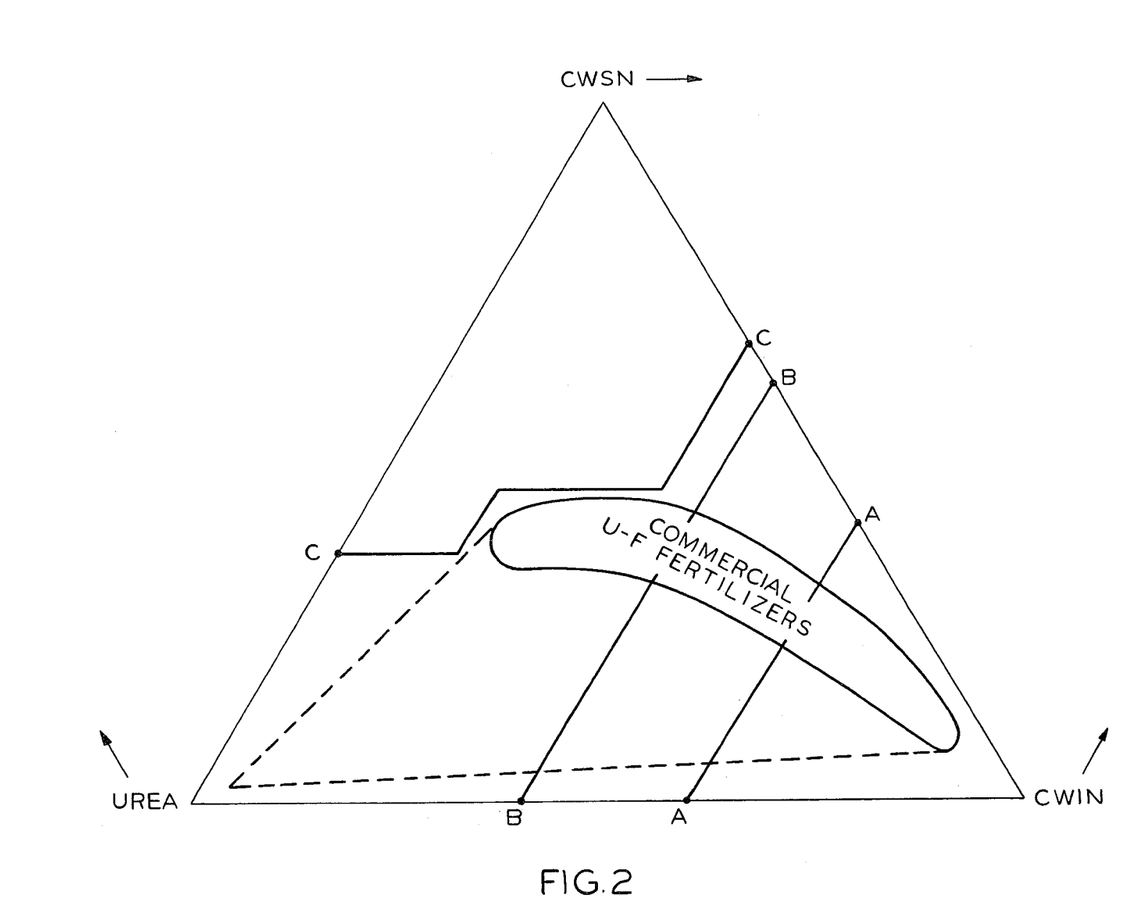
FIG. 2 is a ternary diagram showing the distribution of the urea and formaldehyde reaction products and free urea in the compositions of the invention.

Virtually all commercial urea-formaldehyde compositions contain varying proportions of urea nitrogen. In order therefore to illustrate and compare the present compositions with existing urea-formaldehyde fertilizer compositions, a second ternary diagram has been prepared in which HWSN and HWIN (all cold water insoluble nitrogen) have been combined as one component, CWIN. CWSN is the second component and urea nitrogen is the third component (CWSN is cold water soluble nitrogen excluding urea). In FIG. 2, the three vertices of the triangle are therefore CWSN, urea and CWIN. Since the focus of the present invention is the short chain polymers contained in the CWSN fraction, the ternary diagram of FIG. 2 is also useful for illustrating the invention and its relation to the prior art. As shown on this diagram, all known ureaform compositions are to the right of the 60% CWIN line labeled A—A because, as above indicated, ureaform is defined as containing 60% or more CWIN. The aforementioned Greidinger et al patent discloses a product containing "about 40%" cold water insoluble nitrogen. The Greidinger et al compositions would therefore lay along a narrow band surrounding at least some portion of the line B—B of the ternary diagram of FIG. 2. The bulk of presently available commercial urea-formaldehyde compositions are demarcated by the irregularly shaped region shown in FIG. 2. If the commercial U-F fertilizers were to be mixed with varying amounts of urea, the compositions would fall within the generally triangular area shown within dotted lines. The fertilizer compositions of the present invention fall above the line C—C in FIG. 2. The line C—C defines the area of the diagram containing more than 45% CWSN when the amount of CWIN is between 15 and 35 and more than 35% CWSN when the amount of CWIN is less than 15%.

The predominately low polymer methylene urea compositions of the invention cannot be produced by conventional urea-formaldehyde condensation processes. The compositions are instead produced by a two-stage urea-formaldehyde condensation reaction involving the use of ammonia in the first stage. The process of producing the present compositions is more fully disclosed in my copending application Ser. No. 288,456, filed of even date herewith. The first stage of the process involves the reaction of urea (or a urea source) and formaldehyde (or a formaldehyde source) in the presence of ammonia to form a resin containing reactive intermediates (methylol ureas and an unknown intermediate). The ammonia reacts preferentially with the formaldehyde to form an unknown intermediate which is believed to be ultimately responsible for the formation of the short chain methylene ureas. Liquid chromatographic studies indicate that the unknown intermediate is similar in structure, but not identical, to hexamethylenetetramine. The first stage of the reaction is alkaline. The second stage involves acidification to form the methylene urea polymers. During this stage, the unknown intermediate formed from ammonia appears to temper the reaction resulting in a higher proportion of short chain polymers.

The compositions of the invention may be used either with or without an inert carrier. It is preferable to use a carrier in the practice of the invention because the absence of long chain polymers makes it more difficult to create the particle substrate necessary for a particulate product. The composition may also contain phosphorus or potassium nutrients (as $P_2O_5$ or $K_2O$) and secondary or micronutrients to produce "complete" fertilizers rather than nitrogen only fertilizers. One particularly suitable carrier is expanded or porous vermiculite of the type shown, for example, in U.S. Pat. No. 3,076,700 to V. A. Renner. If a porous carrier is used, the methylol ureas together with the unknown intermediate are sprayed in liquid solution onto the carrier which typically will have been mixed with a source of phosphorus and potassium nutrients such as mono-ammonium phosphate, potassium sulfate or potassium chloride. In addition, other salts such as ammonium sulfate and ferrous sulfate may be added. The carrier should be used in an amount such that it will comprise about 10 to 50% by weight, usually 20 to 35%, of the total weight of the fertilizer composition. The carrier and fertilizer are then acidified by, for example, spraying evenly with sulfuric or phosphoric acid to condense the reactive intermediates to form methylene urea polymers. The now granular or particulate product containing fertilizer within the pores of the carrier is then cured to effect final condensation and dried.

Alternatively, the fertilizer compositions may themselves be used without a carrier. A method for producing such urea-formaldehyde fertilizers is disclosed in U.S. Pat. No. 3,705,794 to R. H. Czurak et al. Fertilizer compositions without a carrier in accordance with the present invention are prepared essentially as set forth in the preceeding paragraph except that, rather than spraying the methylol urea-intermediate liquid suspension onto a carrier, the acid is injected into the liquid suspension to initiate the stage 2 condensation reaction. The reaction mixture, now in liquid or semi-solid form, is then transferred to a drier to remove water and complete condensation, if necessary, to form a dry, granular fertilizer.

A third form of particulate fertilizer may be made by slurrying an inert carrier with the resin (methylol urea and intermediate) before acidifying. The inert carrier may, for example, be sawdust, gypsum, coffee grounds, clays or other well known inert carriers in particulate form. The type and amount of inert substance is limited only by the viscosity or thickness of the slurry and its effect on reactivity of the resin. After acidifying, the condensation reaction proceeds in and around the inert particles which serve as granular nuclei. Whether used with or without a carrier, the compositions will normally contain from 20 to 41% by weight of nitrogen.

The following examples are illustrative of the practice of the invention. All parts and percentages are by weight unless otherwise indicated.

EXAMPLE 1

Urea, urea-formaldehyde concentrate (UFC-85), anhydrous ammonia and water were fed into an agitated tank at 5.75, 2.26, 0.51 and 0.56 lbs/min respectively. (UFC-85 is a precondensed solution of formaldehyde and urea containing substantial amounts of free formaldehyde and dimethylol ureas.) The residence time in the tank was approximately 45 minutes during which time the solution was maintained at 180° F. and a pH of 10.1. The solution was then sprayed into a continuous mixer being fed with expanded vermiculite, finely ground mono-ammonium phosphate and finely ground potassium chloride at rates of 2.75, 0.72 and 0.64 lbs/min respectively. Sulfuric acid (50% concentration) was sprayed onto the mixture at 0.67 lb/min to initiate the condensation reaction. The reaction mixture was passed through a continuous belt dryer for 20 minutes at 300° F. The resulting solid at about 2.0 percent moisture was crushed and screened to pass an 8-mesh screen (US Sieves). The product had the nutrient characteristics shown in Table I.

EXAMPLES 2–4

These examples show how the nitrogen polymer distribution can be altered through proper choice of operating conditions. The process sequence is essentially the same as Example 1.

| Material | Flow Rate (#/min) | | |
|---|---|---|---|
| | Example 2 | Example 3 | Example 4 |
| Urea | 4.86 | 5.49 | 5.49 |
| UFC | 3.89 | 2.75 | 3.69 |
| ammonia | 0.72 | 0.41 | .41 |
| water | 0.48 | 0.61 | .58 |
| expanded vermiculite | 2.89 | 2.83 | 3.08 |
| Monammonium Phosphate | 0.68 | 0.69 | .69 |
| Potassium Chloride | 0.62 | 0.64 | .65 |
| Sulfuric Acid (50%) Solution | 0.49 | 0.42 | .42 |
| Temperature (°F.) | 168° F. | 169° F. | 171° F. |
| Dryer Temperature (°F.) | 300° F. | 290° F. | 320° F. |

This procedure yielded products with the characteristics shown in Table I.

EXAMPLES 5-7

These examples illustrate the manufacture of products without a carrier.

Resin (methylol ureas and ammonia intermediate) preparation for each of the products was identical and as follows:

a. Urea, UFC and $NH_4OH$ were added to a beaker. Heating of the resin began immediately. The urea usually dissolved completely in less than 8 min.
b. The resin was brought to 170° F. and held at that temperature until 30 minutes of total heating (from start) was realized.
c. The resin pH was generally maintained between 9 and 11 without addition of alkali during the heating cycle.
d. The resin was acidulated using 50% concentration acid, at the 30 minute mark.

Formulation variables were as follows:

| Example | (Urea/UFC) Weight | ($NH_4OH$/UFC) Weight | Acid (% Total Resin Weight) |
|---|---|---|---|
| 5 | 2.2 | 0.12 | 3.0 |
| 6 | 1.9 | 0.40 | 8.0 |
| 7 | 1.9 | 0.40 | 16.0 | e. After reaction, the samples were placed in pans in a thin layer for drying. The products were dried at 150° F. at 40–50% relative humidity in a constant temperature-humidity chamber for 48–72 hours. The materials were granulated (crushed) and had the product characteristics shown in Table I. Examples 6 and 7 were considered dry, granular solids while Example 5 was considered a gummy solid.

Tables II and III show the agronomic performance of the materials of Examples 1 through 4. Table II shows the relative response and tolerance characteristics of Examples 1–4 compared to equal rates of nitrogen as urea, a commercially available controlled release nitrogen fertilizer sold under the Turf Builder trademark and an unfertilized check. It is readily seen that the materials which are rich in short chained methylene ureas have desirable response characteristics (both initial and residual response) as well as improved safety over urea.

Table III illustrates the improved nitrogen efficiency of short chained methylene urea products. Products of Examples 1–4 were applied at reduced nitrogen rates compared to an accepted controlled release material which was applied at 0.9# N/M. In spite of rate reductions of 17%–22%, the products gave initial and residual response characteristics favorable to the standard even though it was applied at a higher rate. Results were confirmed on several soil types.

TABLE I

| | | Nutrient Characteristics of Example Products | | | | | | |
|---|---|---|---|---|---|---|---|---|
| | | | | Nitrogen Distribution | | Polymeric N Distribution | | |
| Example | N | P % | K | Urea | CWSN % | CWIN | CWSNP | HWSNP % | HWINP |
| 1 | 26.08 | 3.18 | 3.20 | 33.9 | 50.4 | 15.7 | 71.4 | 16.7 | 11.9 |
| 2 | 25.04 | 3.48 | 3.28 | 24.6 | 58.6 | 16.8 | 62.8 | 19.9 | 17.3 |
| 3 | 25.99 | 3.39 | 2.67 | 34.2 | 53.7 | 12.1 | 75.9 | 14.1 | 10.0 |
| 4 | 25.65 | 3.36 | 3.10 | 28.4 | 49.7 | 21.9 | 61.2 | 15.0 | 23.8 |
| 5 | 40.05 | 0.0 | 0.0 | 29.0 | 53.1 | 17.9 | 72.1 | 17.2 | 10.7 |
| 6 | 38.29 | 0.0 | 0.0 | 24.6 | 63.6 | 11.8 | 80.2 | 16.0 | 3.8 |
| 7 | 38.09 | 0.0 | 0.0 | 13.2 | 60.2 | 26.7 | 60.9 | 16.5 | 22.6 |

TABLE II

| Comparison of Injury and Response Characteristics of Products Applied at Equal N Rates | | | | | |
|---|---|---|---|---|---|
| | | Injury Discoloration at (8x)* (10 > 1) | Initial Response Color @ (1x)* (10 > 1) | | Residual Response Color @ (1x)* (10 > 1) | |
| Grass Type | | Bentgrass - Wet | Bluegrass | | Bluegrass | |
| Soil Type | | Blount Silt Loam | Blount Silt Loam | | Blount Silt Loam | |
| Test Number | | 1 | 2 | 3 | 2 | 3 |
| Reading Date (Days after Application) | | 6 | 8 | 7 | 36 | 49 |
| Examples | (1x)* N Rate (lb N/1000 sq. ft.) | | | | | |
| Example 1 | 0.9 | 2.0 | 8.6 | 8.4 | 8.0 | 7.4 |
| Example 2 | 0.9 | 1.3 | 8.2 | 8.0 | 7.8 | 7.8 |
| Example 3 | 0.9 | 0.3 | 8.4 | 7.4 | 7.6 | 7.2 |
| Example 4 | 0.9 | 0.3 | 7.4 | 6.2 | 7.4 | 7.2 |
| Urea | 0.9 | 5.7 | — | — | — | — |
| Turf Builder | 0.9 | 0.7 | 7.4 | 6.8 | 7.0 | 7.1 |

TABLE II-continued

| Comparison of Injury and Response Characteristics of Products Applied at Equal N Rates | | | | | |
|---|---|---|---|---|---|
| Check | 0 | 0.2 | 1.0 | 1.8 | 1.0 | 1.8 |

*Number of times normal application rate (0.9 lb N/1000 sq. ft.)

TABLE III

Nitrogen Efficiency of Products Compared to a Traditional Slow Release Material

| | Initial Response Color (10 > 1) Bluegrass | | | Residual Response Color (10 > 1) Bluegrass | | |
|---|---|---|---|---|---|---|
| Grass type | | | | | | |
| Soil type | Blount Silt Loam | Woodstown Fine Sandy Loam | | Blount Silt Loam | | Woodstown Fine Sandy Loam |
| Test Number | 2 | 3 | 4 | 2 | 3 | 4 |
| Reading Date (Days after Application) | 8 | 7 | 7 | 36 | 49 | 42 |
| N Rate (lb N/1000 sq. ft.) | .7 | .7 | .75 | .7 | .7 | .75 |
| N - Rate Reduction over Std Formula | 22% | 22% | 17% | 22% | 22% | 17% |
| 1 | 7.8 | 8.4 | 8.3 | 7.6 | 7.6 | 10.0 |
| 2 | 7.6 | 7.0 | 7.7 | 7.2 | 6.8 | 9.3 |
| 3 | 7.6 | 7.2 | 8.7 | 7.6 | 7.0 | 10.0 |
| 4 | 7.2 | 6.8 | 7.0 | 6.6 | 7.0 | 8.7 |
| TB[1] | 7.4 | 6.8 | 7.7 | 7.0 | 7.1 | 9.7 |
| Check[2] | 1.0 | 1.8 | 3.7 | 1.0 | 1.8 | 3.7 |

[1] Turf Builder (the standard for comparison) was applied at 0.9# N/1000 sq. ft.
[2] Check was unfertilized plots.

The foregoing Tables II and III show that nitrogen efficiency was dramatically increased by utilizing urea-formaldehyde reaction products containing the critical high levels of MDU and DMTU. This translates into reduced rates of application necessary for equivalent performance or equivalent rates to obtain superior performance as compared to currently available slow release nitrogen sources.

The invention is based in part on the discovery that the short chain MDU and DMTU polymers have considerably greater agronomic efficiency than the higher methylene urea polymers but yet retain the safety and slow release characteristics of the higher polymers. Theoretically, it would be desirable, if economically feasible, to produce a fertilizer containing only the short chain polymers. The following example is intended to illustrate this conclusion.

EXAMPLE 8

This example shows the nitrogen efficiency, agronomic safety and slow release characteristics of short chained methylene ureas in their pure state.

Chemically, pure methylene diurea (MDU) and dimethylene triurea (DMTU) were prepared using preparative liquid chromatography. A concentrated aqueous solution of a mixture of methylene ureas was injected onto a liquid chromatography column with water as the mobil phase (200–500 ml/min). Individual methylene ureas were collected after detection by refractive index. Water was removed by evaporation from fractions collected and purity determined by analytical high pressure liquid chromatography, molecular weight determinations and elemental analysis.

Figure 3:
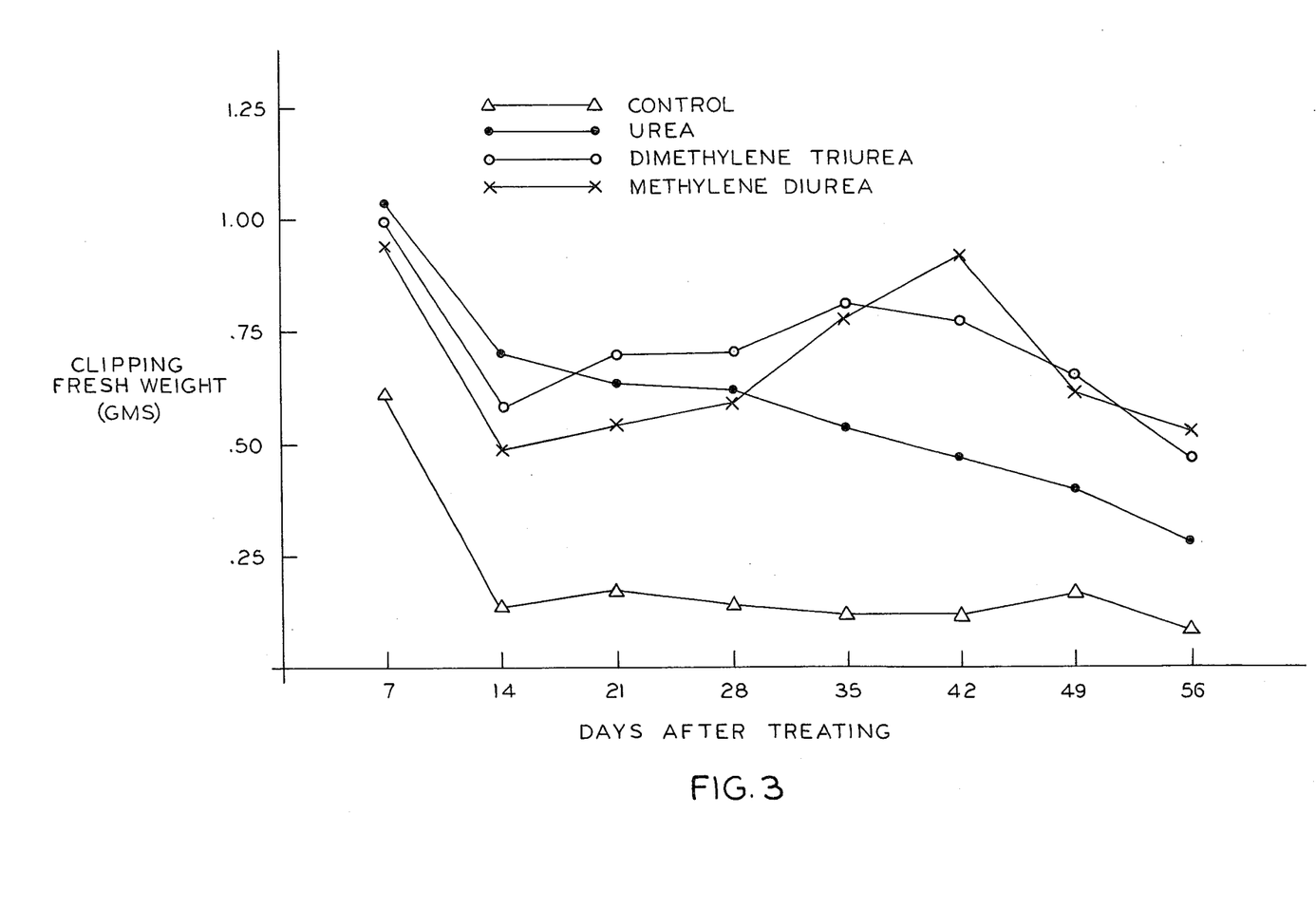
FIGS. 3 and 4 are graphs showing the relative agronomic response of short chain methylene urea polymers as compared to urea.

These formulations were applied to Kentucky bluegrass at a rate of 5 lbs N/1000 sq. ft. FIG. 3 shows the fresh weight of bluegrass clippings as affected by urea and the methylene urea polymers. As shown in FIG. 3, urea, methylene diurea and dimethylene triurea induced comparable growth during the first 28 days of the study. However, on the 35th day, the residual characteristics of the MDU and DMTU as compared to urea became apparent and continued until the 56th day. These differences were statistically significant at the 5% level during most of this time span.

Figure 4:
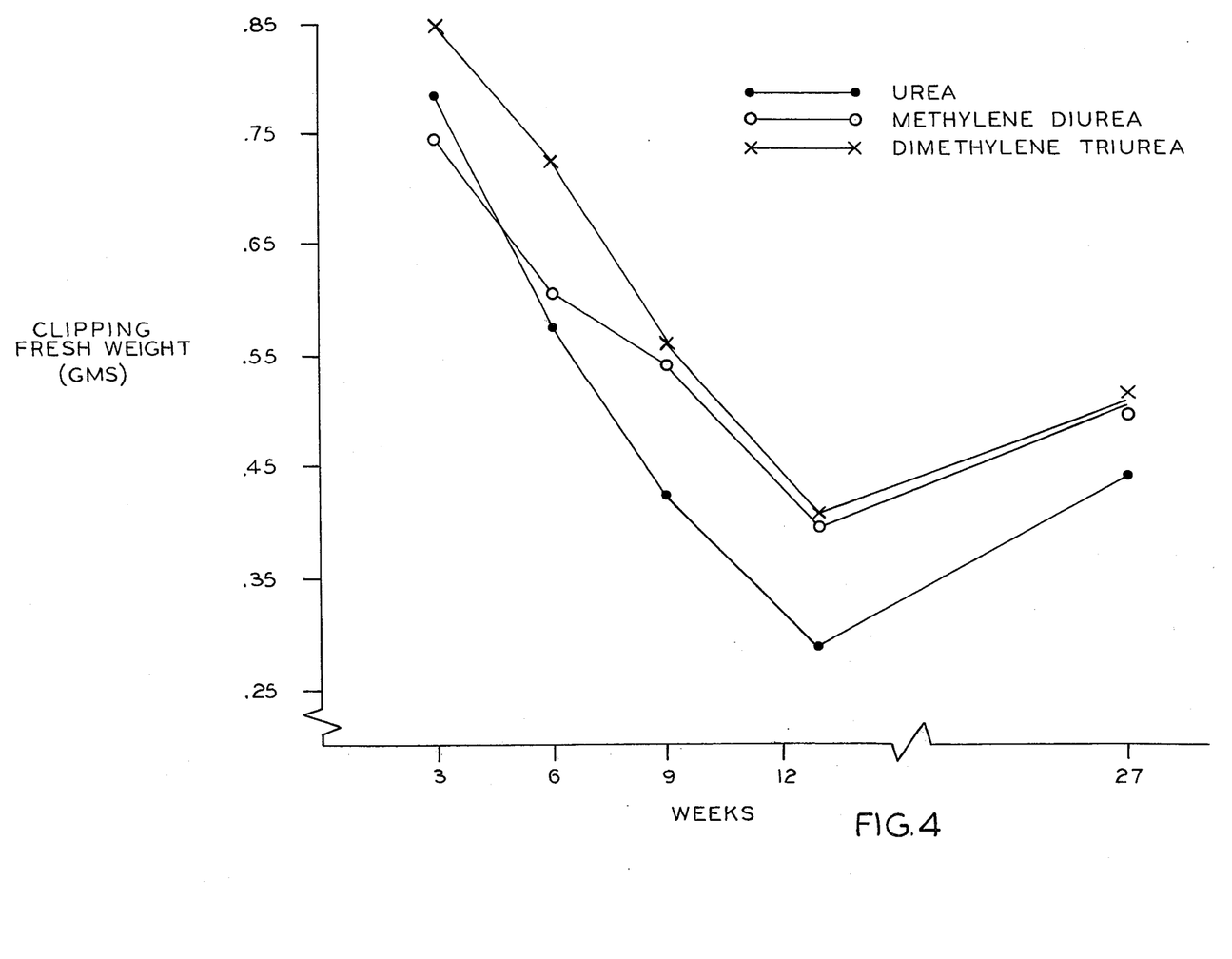

In FIG. 4, clipping fresh weights were compared using average yield over three week time spans. Pooling the data, irrespective of rates (2, 5, 8 lb. N/1000 sq. ft), reduced the variability which may occur because of environmental stress and provided a more accurate picture of the results. FIG. 4 shows the residual characteristics of MDU and DMTU over a 27 week time frame. DMTU was significantly better than urea at all dates except during the first three weeks. MDU was similar to urea during the first six weeks, then was significantly better than urea during the remainder of the test. MDU & DMTU both exhibit residual characteristics significantly superior to urea.

Table IV illustrates the safety of short chain methylene urea polymers. Urea, MDU, DMTU and dimethylolurea were applied to moist Kentucky Bluegrass at 8 lb N/1000 ft$^2$. Dimethylolurea is one of the reaction intermediates in the methylene urea polymerization. Neither MDU nor DMTU produced any noticeable injury whereas urea and dimethylolurea gave considerable injury.

TABLE IV

Tolerance of Kentucky Bluegrass to Urea, Methylene Ureas & dimethylolurea

| Nitrogen Source | Lbs N/1000 Sq. Ft. | % Injury Days After Treating | | | |
|---|---|---|---|---|---|
| | | 3 | 7 | 21 | 28 |
| Methylene diurea | 8 | 0 | 1.7 | 0 | 0 |
| Dimethylene triurea | 8 | 0 | 0 | 0 | 0 |
| Urea | 8 | 26.7 | 25.0 | 23.0 | 14.0 |
| dimethylolurea | 8 | 30.0 | 65.0 | 58.0 | 57.0 |
| Control | 0 | 0 | 0 | 0 | 0 |

The invention has been illustrated with specific examples of fertilizer compositions. Many other nutrients, as well as micronutrients, and control chemicals such as herbicides, fungicides and insecticides may be combined with the products of the invention. Examples of other additives are shown in the aforementioned Renner U.S. Pat. No. 3,076,700 and Czurak et al U.S. Pat. No. 3,705,794, the disclosures of both of which are hereby incorporated by reference. Other pesticides which may be used are shown in the Pesticide Manual, 6th Edition, British Crop Protection Council, 1980. Other herbicides which may be used are shown in Weed Control, 2nd Edition, 1962, Robbins et al., McGraw-Hill Book Company, Inc., New York, N.Y. Other fertilizer nutrients which may be used in combination are shown in Commercial Fertilizers, 5th Edition, 1955, Collings, McGraw-Hill Book Inc., New York, N.Y.

I claim:

1. In a controlled release solid fertilizer composition in particulate form comprising the reaction product of urea and formaldehyde, said reaction product containing polymeric nitrogen in the form of methylene urea polymers of varying chain length, the improvement in which at least 60% of the polymeric nitrogen is in the form of cold water soluble nitrogen polymers consisting of short chain polymers selected from the group consisting of methylene diurea and mixtures of methylene diurea and dimethylene triurea.

2. The fertilizer composition of claim 1 containing up to 70% urea.

3. The fertilizer composition of claim 1 containing an inert carrier for said fertilizer.

4. The fertilizer composition of claim 3 in which said carrier is porous and the fertilizer is contained within the pores of said carrier.

5. The fertilizer composition of claim 4 in which the porous carrier is vermiculite.

6. The fertilizer composition of claim 1 containing additional plant nutrients.

7. The fertilizer composition of claim 6 containing phosphorus and potassium plant nutrients.

8. The fertilizer composition of claim 1 containing pesticides.

9. The fertilizer composition of claim 1 in which at least 45% of the nitrogen consists of cold water soluble reaction products when the amount of cold water insoluble nitrogen is between 15 and 35 percent of the total and more than 35% of the nitrogen consists of cold water soluble reaction products when the percentage of cold water insoluble nitrogen is less than 15%.

10. The fertilizer composition of claim 9 in which less than 20% by weight of said nitrogen consists of cold water insoluble nitrogen.

11. The fertilizer composition of claim 9 containing an inert carrier for said fertilizer.

12. The fertilizer composition of claim 11 in which said carrier is porous and the fertilizer is contained with the pores of said carrier.

13. The fertilizer composition of claim 12 in which the porous carrier is vermiculite.

14. The fertilizer composition of claim 9 containing additional plant nutrients.

15. The fertilizer composition of claim 14 containing phosphorus and potassium plant nutrients.

16. The fertilizer composition of claim 9 containing pesticides.

* * * * *